M. COLE.
FILTER.
APPLICATION FILED SEPT. 5, 1914.
1,137,581. Patented Apr. 27, 1915.
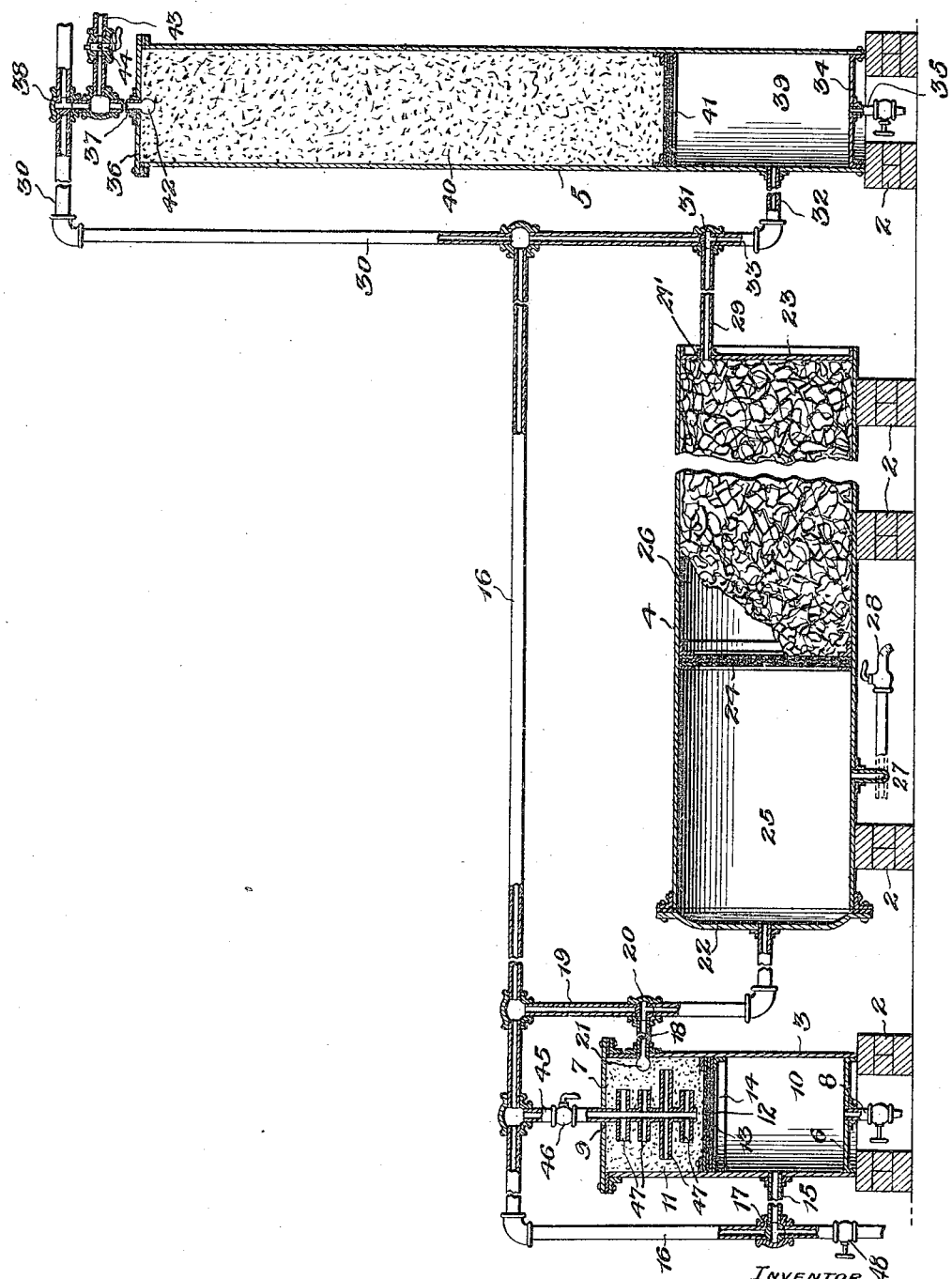
Witnesses
Chas. L. Griesbauer
J. H. Ratcliff
Inventor
Marcellus Cole,
By J. R. Nottingham
Attorney

UNITED STATES PATENT OFFICE.

MARCELLUS COLE, OF WASHINGTON, DISTRICT OF COLUMBIA.

FILTER.

1,137,581.     Specification of Letters Patent.     Patented Apr. 27, 1915.

Application filed September 5, 1914. Serial No. 860,328.

*To all whom it may concern:*

Be it known that I, MARCELLUS COLE, a citizen of the United States, residing at Washington, in the District of Columbia, have invented certain new and useful Improvements in Filters, of which the following is a specification.

The invention relates to an apparatus for filtering liquids in general, but more particularly to the filtration of water; and it consists in the peculiar construction and arrangement of the filtering-chambers; the connections between the several chambers, and suitable valves situated in the connections, whereby the filtration of the liquid, and the thorough cleansing of the chambers may be accomplished.

One of the chief objects of the invention is the production of an apparatus for thoroughly purifying liquids, such as alcoholic and other beverages, and water for household and other purposes.

Another object of the invention is to so construct the apparatus that the several filtering-chambers may be readily cleansed of all sediment and other deleterious deposits, independent of each other, or all cleansed at the same time.

Still another object of the invention is to provide for thoroughly sterilizing all parts of the apparatus before filtration, and after cleansing, so that the apparatus may be placed in a sanitary condition.

Other objects of the invention, such as simplicity and cheapness of construction, and effectiveness in operation, will become apparent upon a complete disclosure thereof.

In the drawing, the figure shown represents a longitudinal, vertical section of my improved filtering apparatus.

In describing my invention I have shown an apparatus suitable for a factory or large building, but it will be understood that by duplication, cities may be provided with a suitable filtration plant.

Referring to the view, the numeral 2 indicates suitable foundation preferably piers, upon which the apparatus is supported; 3 the primary or principal filtering-chamber; 4 the secondary filtering-chamber, and 5 the auxiliary filtering-chamber of greater height than the primary chamber.

The primary filtering-chamber is provided with a fixed head 6 and a detachable head 7, the head 6 being provided with a drain outlet 8, and the head 7 with a central aperture 9, for a purpose to be hereinafter explained. The primary filtering-chamber is divided into two compartments, 10 and 11, by a strainer 12 composed of a wire-gauze disk 13 interposed between two perforated metal plates, said strainer being secured between suitable supports 14. The compartment 10 is provided with an inlet 15 in communication with a supply-pipe 16 by means of a three-way valve 17. The compartment 11 is provided with an outlet 18 in communication with a branch supply-pipe 19 by means of a three-way valve 20, the inner end of said outlet 18 being provided with a wire-gauze hood 21.

The branch supply-pipe 19 is in communication with the secondary filtering-chamber 4 through a central aperture in the detachable head 22, the other head 23 of said chamber being fixed. The secondary filtering-chamber is also divided by a strainer 24, similar in all respects to the strainer 12, into two compartments, 25 and 26, and is provided with a drain-outlet 27, to which may be detachably secured an ordinary hose-faucet 28. The compartment 26 is provided with an outlet 29, which is in communication with a branch supply-pipe 30 by means of a three-way valve 31, the inner end of said outlet 29 being provided with a wire-gauze hood 29'. The branch supply-pipe 30 is in communication with the auxiliary or final filtering-chamber 5 by means of connections 33 and 32.

The auxiliary filtering-chamber has a fixed head 34 provided with a draw-outlet 35, and a removable head 36 provided with an inlet 37 in communication with the branch supply-pipe 30 by means of a three-way valve 38. The said filtering-chamber is also divided into two compartments, 39 and 40, by a strainer 41, similar in all respects to strainers 12 and 24, and the inner end of the inlet 37 is provided with a wire-gauze hood 42. In communication with the inlet 37 is a steam or hot water supply-pipe 43 provided with a cut-off valve 44, the purpose of which will be hereinafter explained.

Passing through the aperture 9 of the head 7 of the primary filtering-chamber, is a pipe 45 in communication with the supply-pipe 16, and provided with a cut-off valve 46, said pipe 45 being provided with a number of communicating branch-pipes 47 situated within the compartment 11.

In operation, the apparatus is first thoroughly sterilized by passing steam or hot water therethrough the three-way valves 37, 31 and 20 being opened for this purpose. After the apparatus has been sterilized, the several compartments 11, 26 and 40 are each filled with a filtering material the compartment 11 being preferably filled with sand, the compartment 26 with sand and gravel, and the compartment 40 with pulverized charcoal; although it will be understood that any suitable substance equivalent to that used in each compartment may be used as a filtering material. In passing the liquid through the apparatus to purify or filter the same the three-way valves 17, 20, 31, and 38 are opened, so that the liquid will pass through inlet 15 into the compartment 10 of the primary filtering-chamber, and through strainer 12 into the compartment 11; out through outlet 18 into the lower portion of branch supply-pipe 19; through said branch supply-pipe into compartment 25 of the filtering-chamber 4, and through the strainer 24 into compartment 26; out through outlet 29 into the compartment 39 of the auxiliary-chamber for final purification or filtration; through the strainer 41 into compartment 40, and out through outlet 37 to building.

In cleansing the several filtering-compartments I prefer to use filtered water, and this I am able to do with my peculiar arrangement of pipe connections and valves, and this feature of my invention forms an important part thereof, for instance, if it be desired to cleanse all three filtering-chambers, the valve 17 is turned to cut off the supply of water to the primary-chamber, but to allow the water to flow into the supply-pipe 16, and the valve 20 turned to cut off the water from said supply-pipe 16, leaving it open to the primary and secondary chamber; the valve 31 is turned to cut off the flow of water from supply-pipes 16 and 30, but to the auxiliary-chamber, the valve 37 is left open to the auxiliary-chamber and closed to the distributing-pipe; the flow of water will then be through supply-pipe 16 to valve 38; through the filter-compartment 40 into compartment 39; out through valve 33 into the filter compartment 26 of the main-filtering-chamber 4; through compartment 25 and valve 20 into the filter compartment 11 of the primary-chamber, from whence it flows into compartment 10 where all sediment and foreign matter passes out through the drain-outlet 8, the sediment and foreign matter being drawn off from the secondary and auxiliary-chambers by manipulating the valves of drain-outlet 27 and 35, the operation being a reversal of filtering operation.

It will be evident that by my arrangement of connections, between the several filtering-chambers, and the three-way valves that each chamber may be cleansed independent of another, for instance, the primary filtering-chamber may be cleansed independently of the main and auxiliary-chambers, while said secondary and auxiliary-chambers are in use, by cutting off communication between the branch-pipe 19 and said primary filtering-chamber, and allowing the water to pass through supply-pipe 16 to the secondary filtering chamber, the cleansing of the primary-chamber through the medium of pipe 45 and branches 47. To cleanse the secondary filtering-chamber independently of the other two chambers, the valve 17 is closed to the primary-chamber and the valve 20 to both primary and secondary-chambers, and the valves 38 and 31 closed to the auxiliary-chamber, but the valve 31 is open to said secondary-chamber, allowing the water to pass through the supply-pipe 16; through branch-pipe 30 and outlet 29 into said secondary-chamber the sediment and foreign matter passing out through the drain-outlet 27 with the water. To cleanse the auxiliary-chamber independent of the primary and secondary-chambers, communication of the supply-pipe with the primary and secondary-chambers, and with the lower portion of the branch-pipe with the secondary-chamber, is cut off, allowing the water to pass through the supply pipe 16; upper portion of the branch 30, and through inlet 39 into the auxiliary-chamber, the valve 38 being opened to permit the same, all foreign matter passing out through drain outlet 35.

It will be noted that each filtration-compartment contains a different filtering material, the primary-chamber containing sand; the secondary chamber sand and gravel, and the auxiliary or final chamber containing charcoal, so that successive filtrations, of varying degrees, is obtained, and that as each chamber is divided into two compartments it will be obvious that a portion of the impurities contained in the liquid being filtered will be deposited in the compartments 10, 25, and 39 before passing through the filtering materials.

It will be noted that all three-way valves are of the ordinary type, and that suitable gaskets are interposed between the several heads and the flanges to which they are secured. When the pressure of water is very high a valve 48 may be employed to regulate the flow of water, as will be obvious.

Having thus fully described my invention what I claim is—

1. A successive filtration system, having in combination a vertical primary chamber; a horizontal secondary chamber; a vertical final chamber higher than the other two, each chamber being divided into two compartments by a reticulated partition, one of said compartments in each chamber adapted to receive a filtering material; a main supply-pipe 16, a branch-pipe 15 connecting said main supply-pipe with the non-filtering compartment of the primary chamber; a three-way valve 17 located at the junction of said supply and branch-pipes; a branch-pipe 19 connecting the main supply-pipe with the non-filtering compartment of the secondary chamber; an outlet 18 connecting the filter compartment of the primary chamber with the branch-pipe 19; a three-way valve 20 located at the junction of the outlet 18 and branch-pipe 19; a branch-pipe 30 connecting the main supply-pipe 16 with the compartments 39 and 40 of the final chamber by means of inlets 32 and 37 respectively; an outlet 29 connecting the filtering-compartment of the secondary chamber with the branch-pipe 30; a three-way valve 31 located at the junction of the outlet 29 and said branch-pipe 30, and a three-way valve 38 located at the junction of the inlet 37 and branch-pipe 30, whereby the filtered and purified liquid may be supplied to a distributing-pipe.

2. A filtration system, having in combination primary and final chambers, each chamber having filtering and non-filtering compartments, the latter chamber being higher than the former; a main-pipe 16; a branch-pipe 15 connecting the main-pipe with the non-filtering compartment of said primary chamber; a three-way valve 17 located at the junction of said main and branch-pipes; a branch-pipe 19 in communication with the main pipe; an outlet 18 connecting the branch-pipe 19 with the filtering compartment of the primary chamber; a three-way valve 20 located at the junction of said outlet 18 and the branch-pipe 19; a branch-pipe 30 connecting the main-pipe with the filtering and non-filtering compartments of said final chamber by means of inlets 32 and 37 respectively; a three-way valve 31 located in said branch-pipe 30; a three-way valve 38 located at the junction of the branch-pipe 30 and the inlet 37, and a valved-pipe in communication with the inlet 37, whereby a heating medium may be introduced for sterilizing the chambers and connections.

In testimony whereof I affix my signature in presence of two witnesses.

MARCELLUS COLE.

Witnesses:
DOROTHY HARVEY,
J. R. NOTTINGHAM.

Copies of this patent may be obtained for five cents each, by addressing the "Commissioner of Patents, Washington, D. C."